(12) United States Patent
Osumi

(10) Patent No.: US 6,298,665 B1
(45) Date of Patent: *Oct. 9, 2001

(54) POWER GENERATING DEVICE EMPLOYING HYDROGEN ABSORBING ALLOYS AND LOW HEAT

(75) Inventor: Yasuaki Osumi, Atsugi (JP)

(73) Assignee: World Fusion Limited (HK)

( * ) Notice: Subject to any disclaimer, the term of this patent is extended or adjusted under 35 U.S.C. 154(b) by 0 days.

This patent is subject to a terminal disclaimer.

(21) Appl. No.: 09/629,931

(22) Filed: Aug. 1, 2000

Related U.S. Application Data

(63) Continuation-in-part of application No. 09/202,625, filed as application No. PCT/JP96/01741 on Jun. 21, 1996.

(51) Int. Cl.$^7$ .................................................. F01K 25/06
(52) U.S. Cl. .............................. 60/649; 60/671; 60/673; 60/676
(58) Field of Search .................. 60/641.1, 641.2, 60/641.8, 649, 671, 673, 676

(56) References Cited

U.S. PATENT DOCUMENTS

| | | | |
|---|---|---|---|
| 4,198,827 | * 4/1980 | Terry et al. | 60/649 |
| 5,638,673 | * 6/1997 | Yabe | 60/649 |
| 5,906,316 | * 9/1998 | Avakov et al. | 60/644 |

* cited by examiner

Primary Examiner—Hoang Nguyen
(74) Attorney, Agent, or Firm—Curtis L. Harrington

(57) ABSTRACT

A power generating device employing hydrogen absorbing alloy and low heat and further comprising: two types of hydrogen absorbing alloys which are able to reversibly absorb and release hydrogen gas and which have different thermal equilibrium hydrogen pressure characteristics; said two types of hydrogen absorbing alloys loaded respectively in a first determined hydrogen absorbing alloy heat exchanger container (1) and a second determined hydrogen absorbing alloy heat exchanger container (2) which are connected ventably to each other; at least two sets of heat generating cycles which employ heat generated when hydrogen gas is moved between said first hydrogen absorbing alloy heat exchanger container (1) and second hydrogen absorbing alloy heat exchanger container (2) provided; a hydrogen compound of one of said hydrogen absorbing alloys at a low temperature side having a higher equilibrium pressure at the same temperature is heated by at least one low quality heat sources (8)(9)(10) having a temperature from 15° C. to 200° C. to release hydrogen; said released hydrogen absorbed by the other hydrogen absorbing alloy at a high temperature side having a lower equilibrium hydrogen pressure to generate heat having a temperature from 80° C. to 500° C. which is higher than the temperature of the low quality heat source; said heat is transmitted to generate heating medium vapor; and where power is generated by a gas turbine (13) driven by pressure of said heating medium vapor.

1 Claim, 2 Drawing Sheets

POWER GENERATING DEVICE EMPLOYING HYDROGEN ABSORBING ALLOYS AND LOW HEAT

This application is a C-I-P of U.S. Ser. No. 09/202,625 filed Dec. 16, 1998 which is a 371 of PCT/JP96/01741 filed Jun. 21,1996.

BACKGROUND OF THE INVENTION

1. Field of the Invention

This invention relates to a power generating device which converts unused heat energy having a temperature from 15° C. to 200° C. such as warm water like waste water discharged from factories, heat discharged from light water reactors and the like, waste heat discharged from gas having middle to low temperature and heat of terrestrial heat energy into heat having a higher temperature from 80° C. to 500° C. by using hydrogen absorbing and releasing actions of hydrogen absorbing alloys, and transmits the heat to a heat medium for a vaporization so that thus obtained vapour drives a turbine to generate power, and can be universally used as a system for converting unused energy to generate power.

2. Description of the Related Art

As one of prior power generating devices using a turbine, a device employing power of a turbine driven by vapour of a heating medium is generally and universally used.

In such a power generating device employing a gas turbine, power generation can be effected in the manner that cooling medium vapour such as steam, ammonia, fluorocarbon, or vapour obtained by vaporizing heating medium such as natural gas with heat is pressed and introduced into the gas turbine to drive the gas turbine, discharged vapour from the gas turbine is cooled and condensed, and thus obtained liquid medium is re-heated to be circulatively introduced into the gas turbine as pressed vapour. In the device, however, a temperature difference between a heating temperature and a cooling temperature should be extremely great, namely 100° C. or greater. In fact, it is difficult to drive the gas turbine of the device with a heating source having a temperature of about 150° C. and a cooling source having a temperature from 10 to 30° C. due to extreme poor thermal efficiency and high cost of equipment.

A power generating device employing hydrogen absorbing alloys which makes use of power of a turbine driven with hydrogen gas has been developed in these years.

In such a power generating device making use of a hydrogen gas turbine, power generation can be effected in the manner that a device loaded with a hydrogen compound of a hydrogen absorbing alloy is heated with a heat source having a temperature from 300 to 350° C. to introduce released hydrogen having a high temperature and a high pressure so as to drive the hydrogen gas turbine, and then discharged hydrogen from the hydrogen gas turbine is introduced into another device loaded with a hydrogen absorbing alloy and absorbed by the hydrogen absorbing alloy so that the device is also heated to circulatively introduce hydrogen having a high temperature and a high pressure into the hydrogen gas turbine. The device, however, has problems such that more hydrogen should be moved than in a heat pump employing hydrogen absorbing alloy, and high temperature from 300 to 350 ° C. should be used on the side of the heat sources, thereby a temperature to release hydrogen rises, thermal efficiency becomes very poor, employed hydrogen absorbing alloys are rapidly deteriorated and declined in quality and durability, and cost of equipment is increased.

In issued U.S. Pat. Ser. No. 6,141,966, to set the utility temperature of the low waste beat 30° C. to 60° C. and high waste heat 80° C. to 90° C. as specific restricted range has as the feature of the present invention been recognized definitely. Also, hydrogen absorbing alloy that is used accordingly, is specified as an alloy of Mish metal-nickel system. However, from now on, the energy source will be supplied in the form of heat from atomic energy, nature energy and waste heat from factories instead of fossil fuel. For example, it may gain heat from a high temperature gas furnace having a temperature below 1000° C., heat from a light-water reactor having a temperature below 300° C., heat from middle to low temperature gas having a temperature 150° C. to 400° C., heat from geothermal energy having temperature below 400° C., heat from solar heat having a temperature below 100° C. that is gained from a solar heat collection device and heat from waste water having a temperature 0° C. to 100°C. Heats that are gained like this have a great variety. Also, in a flow of energy present, about two third of the heat energy (nature energy is not included) is hardly used and is wasted, and its heating value is huge. Using these heats effectively will be a big problem in energy development in future.

The present invention is to solve the above mentioned problems of the prior power generating devices and has an object to provide an economical power generating device with high thermal conversion efficiency which can be used in various fields.

SUMMARY OF THE INVENTION

The present invention relates to a power generating device employing hydrogen absorbing alloys and low heat wherein two types of hydrogen absorbing alloys that can reversibly absorb and release hydrogen gas and have different thermal equilibrium hydrogen pressure characteristics are used and loaded, respectively, in a first hydrogen absorbing alloy heat exchanger container and a second hydrogen absorbing alloy heat exchanger container that are ventably connected to each other, wherein at least two sets of heat generating cycles are provided that employ heat generated when hydrogen gas is moved between the first hydrogen absorbing alloy heat exchanger container and the second hydrogen absorbing alloy heat exchanger container, wherein a hydrogen compound of one of the hydrogen absorbing alloys at a low temperature side that has a higher equilibrium pressure at the same temperature is heated by low quality heat sources having a temperature from 15° C. to 200° C. to release hydrogen, wherein the released hydrogen is absorbed by the other hydrogen absorbing alloy at a high temperature side having a lower equilibrium hydrogen pressure to thereby obtain heat having a temperature from 80 ° C. to 500° C. that is higher than the temperature of the low quality heat sources, and wherein cooling medium vapour is generated by thus obtained heat so that power generation can be effected by a gas turbine. The present device enables to convert low temperature energy which has not been utilized into high temperature energy employing hydrogen absorbing alloys to generate power, with the high temperature energy, efficiently. High temperature heat sources used in the prior power generations are no longer required for the present device due to its high thermal conversion efficiency so that the present device is extremely economical.

PREFERRED EMBODIMENTS OF THE INVENTION

Figure 1:
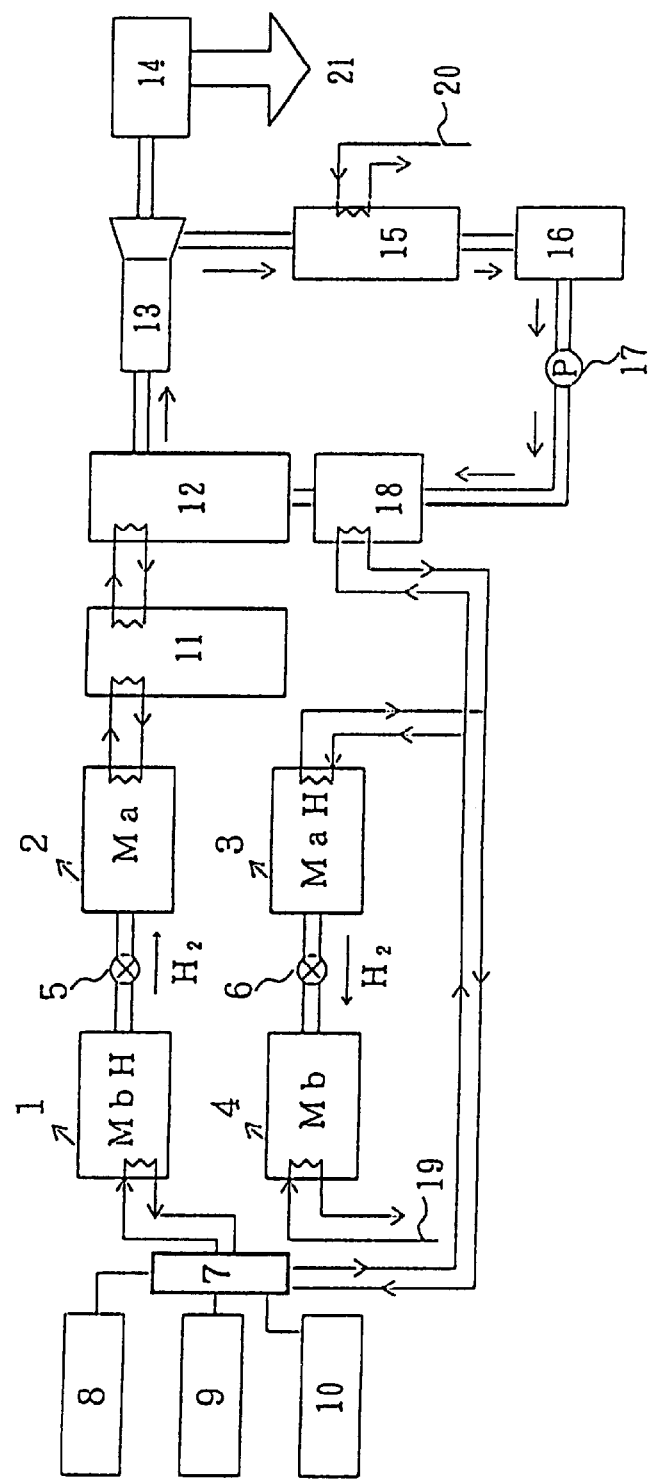
FIG. 1 is a block diagram showing a power generating device employing hydrogen absorbing alloys and low heat relating to the present invention.

One of preferable embodiments will be described hereinafter referring to the drawings.

As shown in FIG. 1, the present power generating device employing hydrogen absorbing alloys and low heat mainly comprises hydrogen absorbing alloy heat exchanger containers 1, 2, 3, 4 loaded with the hydrogen absorbing alloys, a low temperature heat storage tank 7, a high temperature heat storage tank 11, a heating medium vaporizer 12, a gas turbine 13 and a power generator 14.

Figure 2:
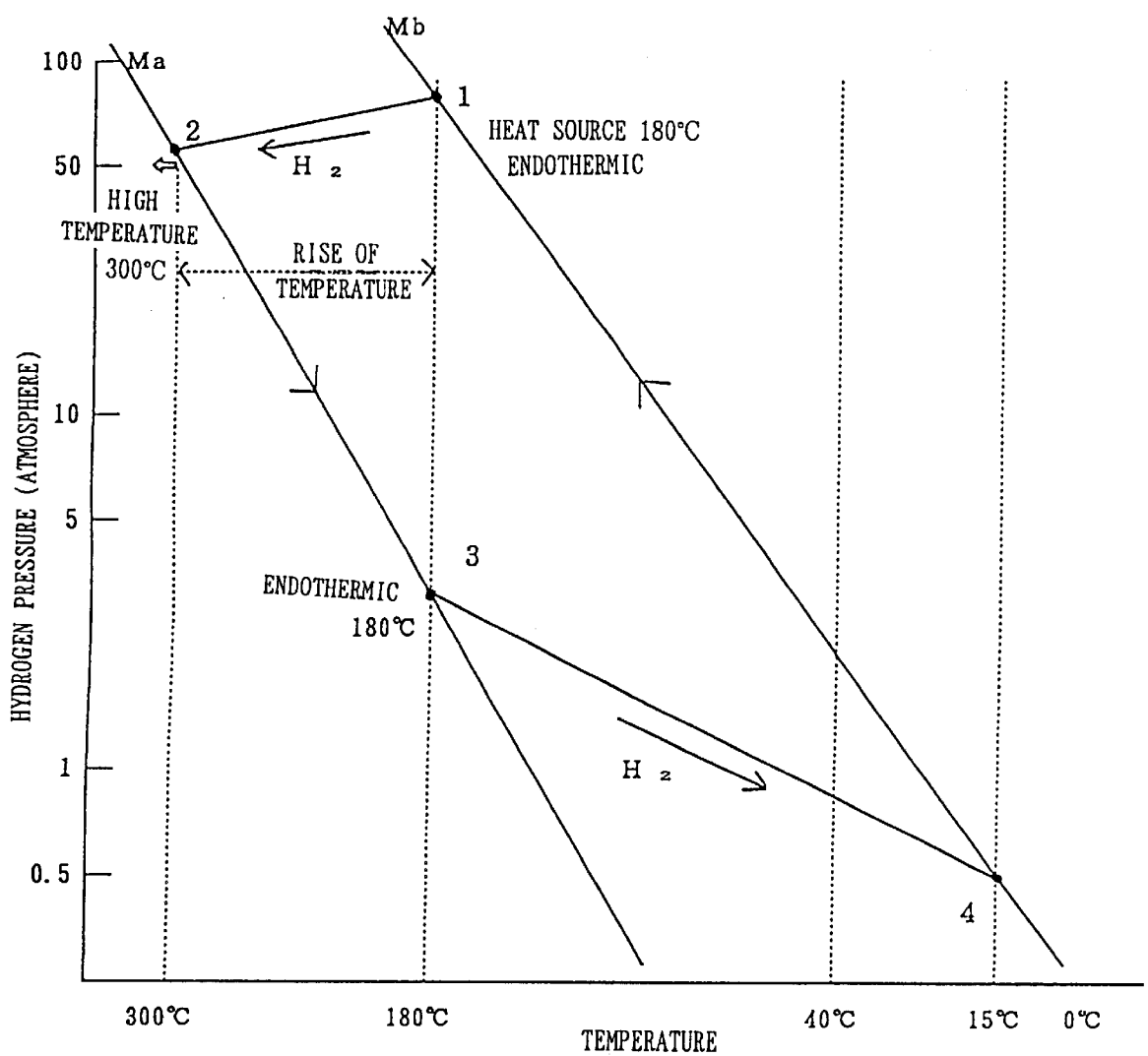
FIG. 2 is a table showing heat generation cycles to drive a power generating device employing hydrogen absorbing alloys and low heat relating to the present invention.

Low quality heat sources (from 15 to 200° C.) such as heat 8 having a temperature higher than 15° C. of warm waste water discharged from factories, heat 9 having a temperature from 100° C. to 200° C. which is discharged from gas having middle to low temperature and from gas of hot blast stoves and heat 10 having a temperature below 200° C. from light water reactors and from terrestrial heat energy are stored in the low temperature heat storage tank 7. Two sets of two types of hydrogen absorbing alloys Ma, Mb having different thermal equilibrium hydrogen pressure characteristics which are loaded respectively in two hydrogen absorbing alloy heat exchanger containers are prepared. Namely, the hydrogen absorbing alloy Ma is loaded in the hydrogen absorbing alloy heat exchanger containers 2, 3, and the hydrogen absorbing alloy Mb is loaded in the hydrogen absorbing alloy heat exchanger containers 1, 4. The hydrogen absorbing alloy heat exchanger containers in each of the sets are connected to each other by means of a valve 5, 6 so that hydrogen gas can move thorough the valves. In the sets, the hydrogen absorbing alloy Mb has a higher equilibrium hydrogen pressure than that of the hydrogen absorbing alloy Ma at the same temperature as shown in FIG. 2. In FIG. 1, 15 shows a medium condenser, 16 shows a tank, 17 shows a medium feed-back pump, 18 shows a preheater, and 19 and 20 show cooling water.

How the power generating device comprises as described above is operated will be described hereinafter.

The hydrogen absorbing alloy Mb in the hydrogen absorbing alloy heat exchanger container 1 at a low temperature side having a higher equilibrium hydrogen pressure absorbs hydrogen to become a metallic hydrogen compound MbH. The hydrogen absorbing alloy heat exchanger container 1 is heated with low temperature medium of 180° C. obtained from unused low quality heat sources 8, 9, 10 in the heat storage tank 7, resulting in an endothermic reaction of the metallic hydrogen compound MbH to release hydrogen since pressure inside the hydrogen absorbing alloy heat exchanger container 1 is increased. The released hydrogen is moved to the hydrogen absorbing alloy heat exchanger container 2 to be absorbed by the hydrogen absorbing alloy Ma at a high temperature side having a lower equilibrium hydrogen pressure. Then an exothermic reaction occurs to generate hot temperature medium of 300° C. which is taken out and stored in the high temperature storage tank 11. Thus heat having a high temperature can be obtained from heat having a low temperature. The heating medium vaporizer 12 is heated with the hot water to vaporize the medium so that so obtained vapour drives turbine 13 to generate power 21 at the power generator 14.

While, in a recycling process, a metallic hydrogen compound MaH in the hydrogen absorbing alloy heat exchanger container 3 is heated with low temperature medium of 180° C. in the low temperature heat storage tank 7 resulting in an endothermic reaction to release hydrogen, since a pressure inside the hydrogen absorbing alloy heat exchanger container 3 is increased. The released hydrogen gas falls in temperature to the air outside of 15° C., and is moved to the hydrogen absorbing alloy heat exchanger container 4 having a decreased pressure so that the hydrogen absorbing alloy Mb at a low temperature side having a higher equilibrium hydrogen pressure absorbs the released hydrogen gas to become again a metallic hydrogen compound MbH so as to repeat the cycle.

As described above, by employing at least two sets of hydrogen absorbing alloys Ma and Mb, high temperature heat can be successively generated and a uniform amount of hydrogen gas can be repeatedly moved between the hydrogen absorbing alloys Ma and Mb with no loss. The present power generating device can be successively driven by heating the cooling medium vaporizer with the successively generated high temperature heat, vaporizing the medium and driving the turbine with the vapour.

As the hydrogen absorbing alloys Ma and Mb, hydrogen absorbing alloys having different equilibrium hydrogen pressures are used. To put it concretely, rare earth hydrogen absorbing alloys are favorably combined and used. More concretely speaking, a combination of alloy of lanthanum-nickel system, alloy of Mish metal-nickel system and alloy of titanium-iron system can be used as the hydrogen absorbing alloy Mb, and a combination of alloy of titanium-cobalt system, alloy of titanium-manganese system, alloy of zirconium-manganese system and alloy of manganese-nickel system can be used as the hydrogen absorbing alloy Ma. It needs to be noted here that the above mentioned Misch metal is a mixture of rare earth metals.

The features of the present application are to extend range of temperature of a low quality heat source 15° C. to 200° C., to use specific hydrogen absorbing alloy and to gain heat having a temperature 80° C. to use specific 500° C. that is higher than the temperature of a low quality heat source. Therefore, the present application can effectively utilize a middle to low waste heat of 15° C. to 200° C. that can be gained from industrial plant or nature energy that could not adopt against U.S. Pat. No. 6,141,966, and it is non-obvious to use middle to high temperature of 80° C. to 500° C. when using a specific hydrogen absorbing alloy. Besides, by changing the kind and composition of the hydrogen absorbing alloy, the feature of the alloy, that is heat of formation (exoergic and endoergic) or temperature are decided inevitably. Therefore, in the present application, to extend range of temperature, to change the kinds and of alloy is necessary, and it is achieved by using and composing of various kinds of alloys that have different features. Restricting various kinds of the upper or lower limit of temperature and restricting the most suitable alloy from various kinds of allow is one of the non-obvious aspects of the present application.

The following table shows one example of principal conditions to operate the present power generating device employing hydrogen absorbing alloys and low heat.

| | |
|---|---|
| AMOUNT OF GENERATED POWER | 100 kW |
| KIND OF HYDROGEN ABSORBING ALLOY | COMBINATION OF MORE THAN TWO KINDS OF HYDROGEN ABSORBING ALLOYS MENTIONED IN THE ABOVE |
| AMOUNT OF HYDROGEN ABSORBING ALLOY | 4000–8000 kg (Depending on the kind of alloy used) |
| ELECTRIC GENERATING EFFICIENCY | 25 - 35% |
| THERMAL CONVERSION EFFICIENCY | 70 - 80% |
| TEMPERATURE OF HIGH TEMPERATURE HEAT SOURCE | 80 - 500° C. |
| TEMPERATURE OF LOW TEMPERATURE HEAT SOURCE | 15 - 200° C. |

The present power generating device employing hydrogen absorbing alloys and low heat can convert low quality (low temperature) heat energy such as warm waste water, discharged heat of gas from light water reactors and hot blast stoves and terrestrial heat energy into high quality (high temperature) heat by employing hydrogen absorbing alloys and enables to generate power efficiently with the heat so that the present invention can reduce consumption of oil and contribute to preserve the earth environment.

What is claimed is:

1. A power generating device employing hydrogen absorbing alloy and low heat and further comprising:

two types of hydrogen absorbing alloys which are able to reversibly absorb and release hydrogen gas and which have different thermal equilibrium hydrogen pressure characteristics;

said two types of hydrogen absorbing alloys loaded respectively in a first determined hydrogen absorbing alloy heat exchanger container and a second determined hydrogen absorbing alloy heat exchanger container which are connected ventably to each other;

at least two sets of heat generating cycles which employ heat generated when hydrogen gas is moved between said first and second hydrogen absorbing alloy heat exchanger containers provided;

a hydrogen compound of one of said hydrogen absorbing alloys at a low temperature side having a higher equilibrium pressure at the same temperature is heated by at least one low quality heat source having a temperature from 15° C. to 200° C. to release hydrogen;

said released hydrogen absorbed by the other hydrogen absorbing alloy at a high temperature side having a lower equilibrium hydrogen pressure to generate heat having a temperature from 80° C. to 500° C. which is higher than the temperature of the low quality heat source;

said heat is transmitted to generate heating medium vapour; and where power is generated by a gas turbine driven by pressure of said heating medium vapour.

* * * * *